United States Patent
Nishimura et al.

(10) Patent No.: US 12,339,197 B2
(45) Date of Patent: Jun. 24, 2025

(54) LEAK DIAGNOSIS DEVICE OF FUEL VAPOR TREATMENT APPARATUS

(71) Applicant: TOYOTA JIDOSHA KABUSHIKI KAISHA, Toyota (JP)

(72) Inventors: Yuusaku Nishimura, Toyota (JP); Keita Fukui, Fujinomiya (JP); Hideki Miyahara, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 66 days.

(21) Appl. No.: 18/449,933

(22) Filed: Aug. 15, 2023

(65) Prior Publication Data

US 2024/0159617 A1    May 16, 2024

(30) Foreign Application Priority Data

Nov. 14, 2022 (JP) ................................ 2022-181944

(51) Int. Cl.
*G01M 3/32* (2006.01)
*F02M 25/08* (2006.01)

(52) U.S. Cl.
CPC .......... *G01M 3/3263* (2013.01); *F02M 25/08* (2013.01); *F02M 25/0809* (2013.01); *F02M 25/0836* (2013.01)

(58) Field of Classification Search
CPC . G01M 3/3263; F02M 25/08; F02M 25/0809; F02M 25/0836
See application file for complete search history.

(56) References Cited

U.S. PATENT DOCUMENTS

| | | | | |
|---|---|---|---|---|
| 5,113,834 A | * | 5/1992 | Aramaki | F02M 25/0809 123/198 D |
| 11,674,477 B2 | * | 6/2023 | Ishihara | F02M 25/0818 73/114.39 |
| 11,840,990 B2 | * | 12/2023 | Akita | F02M 25/0809 |
| 2006/0191330 A1 | * | 8/2006 | Hayakawa | F02M 25/0809 73/114.38 |
| 2012/0186333 A1 | * | 7/2012 | Nishimura | G01M 3/3263 73/40.5 R |
| 2018/0080415 A1 | * | 3/2018 | Kishi | F02M 25/0818 |

FOREIGN PATENT DOCUMENTS

JP    2012-149592 A    8/2012

\* cited by examiner

*Primary Examiner* — Phutthiwat Wongwian
*Assistant Examiner* — Susan E Scharpf
(74) *Attorney, Agent, or Firm* — SoraIP, Inc.

(57) ABSTRACT

A leak diagnosis device for a fuel vapor treatment apparatus, comprising: a first diagnosis unit that performs a leak diagnosis of a fuel tank based on a tank internal pressure in a closed state of a sealing valve; a determination unit that opens a sealing valve in a state where a purge valve and a switching valve are closed when the tank internal pressure is within a normal range, and determines whether there is an influence on the valve openability of the switching valve; and a second diagnosis unit that performs a leak diagnosis of the canister based on the tank internal pressure or the canister internal pressure when the determination unit makes a negative determination, and performs a leak diagnosis of the canister based on the canister internal pressure after closing the closed valve when the determination unit makes an affirmative determination.

1 Claim, 3 Drawing Sheets

LEAK DIAGNOSIS DEVICE OF FUEL VAPOR TREATMENT APPARATUS

CROSS-REFERENCE TO RELATED APPLICATION

This application claims priority to Japanese Patent Application No. 2022-181944 filed on Nov. 14, 2022, incorporated herein by reference in its entirety.

BACKGROUND

1. Technical Field

The present disclosure relates to a leak diagnosis device of a fuel vapor treatment apparatus.

2. Description of Related Art

There is known a leak diagnosis device of a fuel vapor treatment apparatus for performing a leak diagnosis of a fuel tank and a canister. The leak diagnosis is performed as follows. First, a leak diagnosis of the fuel tank is performed based on tank internal pressure in a state where a sealing valve is closed. When the tank internal pressure is within a normal range, the fuel tank is deemed to have no leak abnormality. Next, the sealing valve is opened in a state where a purge valve and a switching valve are closed, and a leak diagnosis of the canister is performed based on the tank internal pressure (see, for example, Japanese Unexamined Patent Application Publication No. 2012-149592 (JP 2012-149592 A)).

SUMMARY

When there is no leak abnormality in a fuel tank, tank internal pressure may be high. In such a state, a leak diagnosis of a canister may be performed. When a sealing valve is opened in a state where a purge valve and a switching valve are closed in the leak diagnosis of the canister, pressure from the fuel tank acts on the switching valve, which may affect valve openability of the switching valve.

Therefore, an object of the present disclosure is to provide a leak diagnosis device of a fuel vapor treatment apparatus that ensures the valve openability of the switching valve.

A leak diagnosis device of a fuel vapor treatment apparatus according to a first aspect of the present disclosure includes:
- a fuel tank for storing fuel of an internal combustion engine;
- a canister for adsorbing evaporated fuel generated in the fuel tank;
- a vapor passage communicating the fuel tank and the canister;
- a purge passage communicating an intake passage of the internal combustion engine and the canister;
- a sealing valve for opening and closing the vapor passage;
- a purge valve for opening and closing the purge passage;
- an outside air introduction passage for introducing outside air into the canister;
- a switching valve for opening and closing the outside air introduction passage;
- a first detection unit for detecting tank internal pressure that is pressure in the fuel tank;
- a second detection unit for detecting canister internal pressure that is pressure in the canister;
- a first diagnosis unit for performing a leak diagnosis of the fuel tank, the leak diagnosis of the fuel tank being performed based on the tank internal pressure in a state where the sealing valve is closed;
- a determination unit for determining whether valve openability of the switching valve is affected when the sealing valve is opened in a state where the purge valve and the switching valve are closed, in a case where the tank internal pressure is within a normal range; and a second diagnosis unit for performing a leak diagnosis of the canister, the second diagnosis unit performing the leak diagnosis of the canister based on the tank internal pressure or the canister internal pressure when determination by the determination unit is negative determination, and the second diagnosis unit performing the leak diagnosis of the canister based on the canister internal pressure after closing the sealing valve when determination by the determination unit is affirmative determination.

The determination unit may determine that the valve openability of the switching valve is affected when the canister internal pressure becomes equal to or higher than a threshold value after the sealing valve is opened in a state where the purge valve and the switching valve are closed.

The threshold value may be a pressure value that is higher than standard atmospheric pressure and lower than the canister internal pressure that affects the valve openability of the switching valve.

The second diagnosis unit may open the switching valve after the leak diagnosis of the canister is performed.

The switching valve may be an electronic valve. The electronic valve may be a solenoid valve including a valve body, a solenoid for applying thrust to the valve body, and a return spring for applying an urging force in a direction opposite to the thrust of the solenoid to the valve body.

When the solenoid is in an energized state, the valve body may close the outside air introduction passage due to an increase in the thrust of the solenoid as compared with the urging force of the return spring.

When the solenoid is in a non-energized state, the valve body may open the outside air introduction passage due to a decrease in the thrust of the solenoid as compared with the urging force of the return spring.

According to the present disclosure, it is possible to provide the leak diagnosis device of the fuel vapor treatment apparatus that ensures the valve openability of the switching valve.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Schematic Configuration of Fuel Vapor Treatment Apparatus

Figure 1:
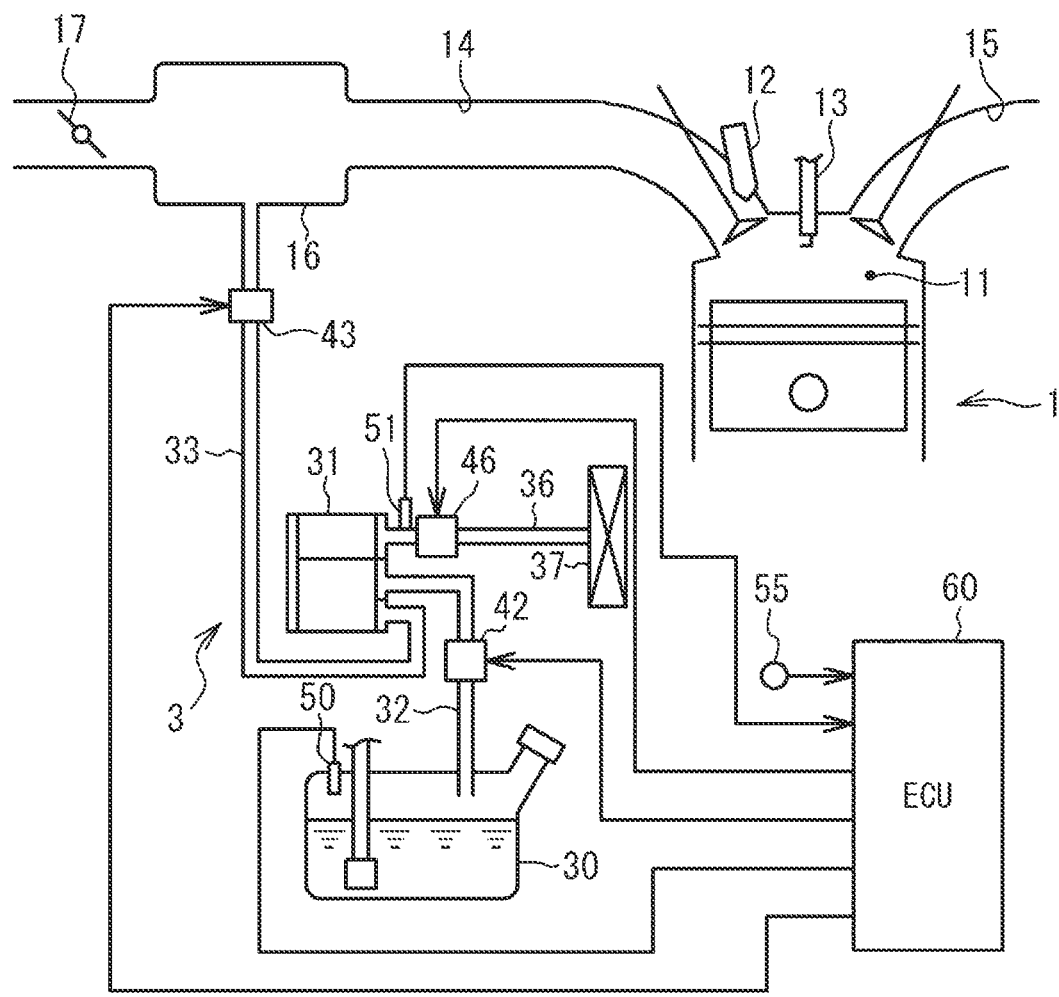
FIG. 1 is a schematic configuration diagram of a fuel vapor treatment apparatus applied to an engine.

FIG. 1 is a schematic configuration diagram of a fuel vapor treatment apparatus 3 applied to an engine 1. In the present embodiment, the engine 1 and the fuel vapor treatment apparatus 3 are mounted on a vehicle. The engine 1 is provided with a fuel injection valve 12 for injecting and supplying fuel to the combustion chamber 11, and an ignition plug 13 for igniting an air-fuel mixture that is a mixture of injected fuel and intake air. An intake passage 14 and an exhaust passage 15 are connected to the combustion chamber 11. A surge tank 16 constituting a part of the intake passage 14 is provided in the middle of the intake passage 14. A throttle valve 17 for metering an intake air amount is provided upstream of the intake air of the surge tank 16.

The fuel vapor treatment apparatus 3 includes a fuel tank 30 that stores fuel. The fuel in the fuel tank 30 is supplied to the fuel injection valve 12 via a fuel supply path. The fuel tank 30 is provided with a tank internal pressure sensor 50 that detects the tank internal pressure, which is the pressure inside the fuel tank 30. The fuel vapor treatment apparatus 3 suppresses the vaporized fuel generated in the fuel tank 30 from being released to the atmosphere.

The fuel vapor treatment apparatus 3 is provided with a canister 31 that adsorbs the vaporized fuel generated in the fuel tank 30. The canister 31 and the fuel tank 30 communicate with each other through a vapor passage 32. A sealing valve 42 for opening and closing the vapor passage 32 is provided in the middle of the vapor passage 32. By opening the sealing valve 42, the evaporated fuel in the fuel tank 30 is once collected by the adsorbent provided in the canister 31.

The canister 31 and the surge tank 16 communicate with each other through a purge passage 33. A purge valve 43 that opens and closes the purge passage 33 is provided in the middle of the purge passage 33. An outside air introduction passage 36 for introducing outside air into the canister 31 is connected to the canister 31. An air filter 37 is provided at an open end of the outside air introduction passage 36.

A switching valve 46 for opening and closing the outside air introduction passage 36 is provided in the middle of the outside air introduction passage 36. The switching valve 46 is a solenoid valve that opens the outside air introduction passage 36 in a non-energized state and closes the outside air introduction passage 36 in an energized state, which will be described in detail later. Further, between the canister 31 and the switching valve 46, a canister internal pressure sensor 51 capable of detecting the canister internal pressure that is the pressure on the canister 31 side is provided. The switching valve 46 and the canister internal pressure sensor 51 will be described in detail later. During engine operation, the switching valve 46 is maintained to open the outside air introduction passage 36. That is, the switching valve 46 is maintained in a state in which the outside air can be introduced into the canister 31.

The engine 1 and the fuel vapor treatment apparatus 3 are controlled by an Electronic Control Unit (ECU) 60. ECU 60 is an electronic control unit including an arithmetic processing unit that performs various arithmetic processing related to travel control of vehicles, and a memory that stores control programs and data. ECU 60 is connected with various sensors for detecting the operating condition of the engine 1, the tank internal pressure sensor 50, the canister-internal-pressure sensor 51, the ignition switch 55 operated by the driver of the vehicle, and the like. ECU 60 executes various controls of the fuel vapor treatment apparatus 3 and the engine 1 based on the signals from the sensors and the switches. ECU 60 is an exemplary leak diagnosis device for the fuel vapor treatment apparatus, and functionally realizes a determination unit, a first diagnosis unit, and a second diagnosis unit, which will be described in detail later.

When the predetermined condition is satisfied, ECU 60 performs a purging process during engine operation. The purge process is a process of opening the purge valve 43 in a state in which the switching valve 46 is opened and the sealing valve 42 is closed. By the purge process, the evaporated fuel is desorbed from the canister 31, and the desorbed evaporated fuel is introduced into the surge tank 16 via the purge passage 33, and is combusted in the combustion chamber 11.

Outline of Configuration of Canister Internal Pressure Sensor

Figure 2A:
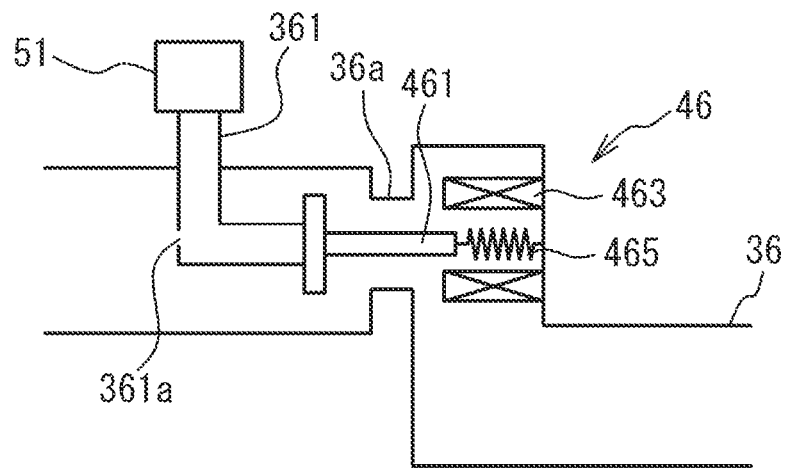
FIG. 2A is a schematic configuration diagram of a switching valve.
Figure 2B:
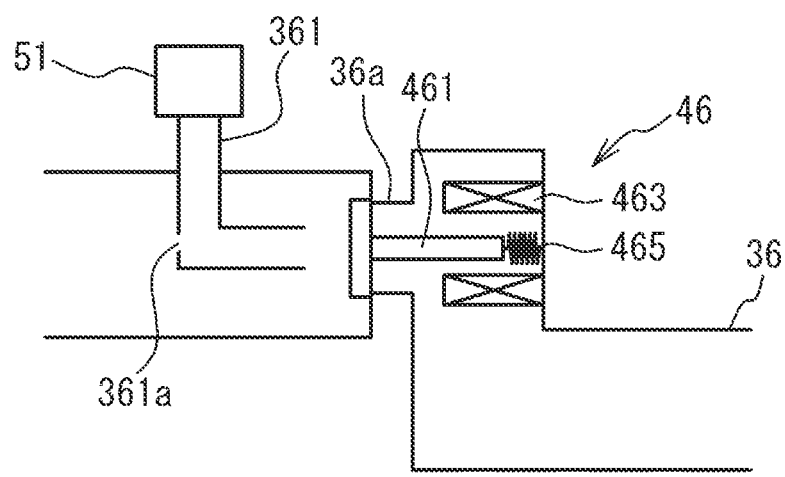
FIG. 2B is a schematic configuration diagram of a switching valve.

FIGS. 2A and 2B are schematic structural views of the switching valve 46. FIG. 2A shows the switching valve 46 in an open valve condition. FIG. 2B shows the switching valve 46 in the closed condition. The switching valve 46 is in a valve open state in a non-energized state and in a valve closed state in an energized state, which will be described in detail later. The switching valve 46 includes a valve body 461, a solenoid 463, and a return spring 465. The solenoid 463 applies a thrust force to the valve body 461. The return spring 465 applies a biasing force in a direction opposite to the thrust force of the solenoid 463 to the valve body 461. When the solenoid 463 is not energized, the valve body 461 is positioned to open the throttle portion 36a in accordance with the biasing force of the return spring 465, as shown in FIG. 2A. That is, the return spring 465 biases the valve body 461 in the valve opening direction. When the solenoid 463 is in the energized state, the thrust of the solenoid 463 becomes larger than the biasing force of the return spring 465. As a result, the thrust of the solenoid 463 moves the valve body 461 in the valve closing direction against the biasing force of the return spring 465. Consequently, as shown in FIG. 2B, the valve body 461 closes the throttle portion 36a.

One end of the sensor passage 361 is inserted into the outside air introduction passage 36. A canister internal pressure sensor 51 is connected to the other end of the sensor passage 361. In the non-energized state of the switching valve 46, the valve body 461 closes one end of the sensor passage 361 by the biasing force of the return spring 465. When the switching valve 46 is in the energized state, the valve body 461 is separated from one end of the sensor passage 361. An opening 361a is formed in the sensor passage 361, and the canister internal pressure sensor 51 can detect the pressure in the outside air introduction passage 36.

ECU 60 executes the leak diagnostic control of the fuel vapor treatment apparatus 3. During the execution of the leak diagnostic control, the internal pressure of the canister may be high when the switching valve 46 is closed as shown in FIG. 2B. When the internal pressure of the canister becomes high, the force in the direction opposite to the biasing direction of the return spring 465 acting on the valve body 461 may be larger than the biasing force of the return spring 465. As a result, the valve body 461 is maintained in the closed state, and even when the solenoid 463 is in the non-energized state, there is a possibility that the valve cannot be immediately opened or the valve cannot be opened. It is also conceivable to solve this problem, for example, by employing a return spring 465 having a large biasing force. However, in this case, there is a possibility that the switching valve 46 becomes larger. Therefore, in the present embodiment, ECU 60 executes the following leakage diagnostic control.

Leakage Diagnostic Control

Figure 3:
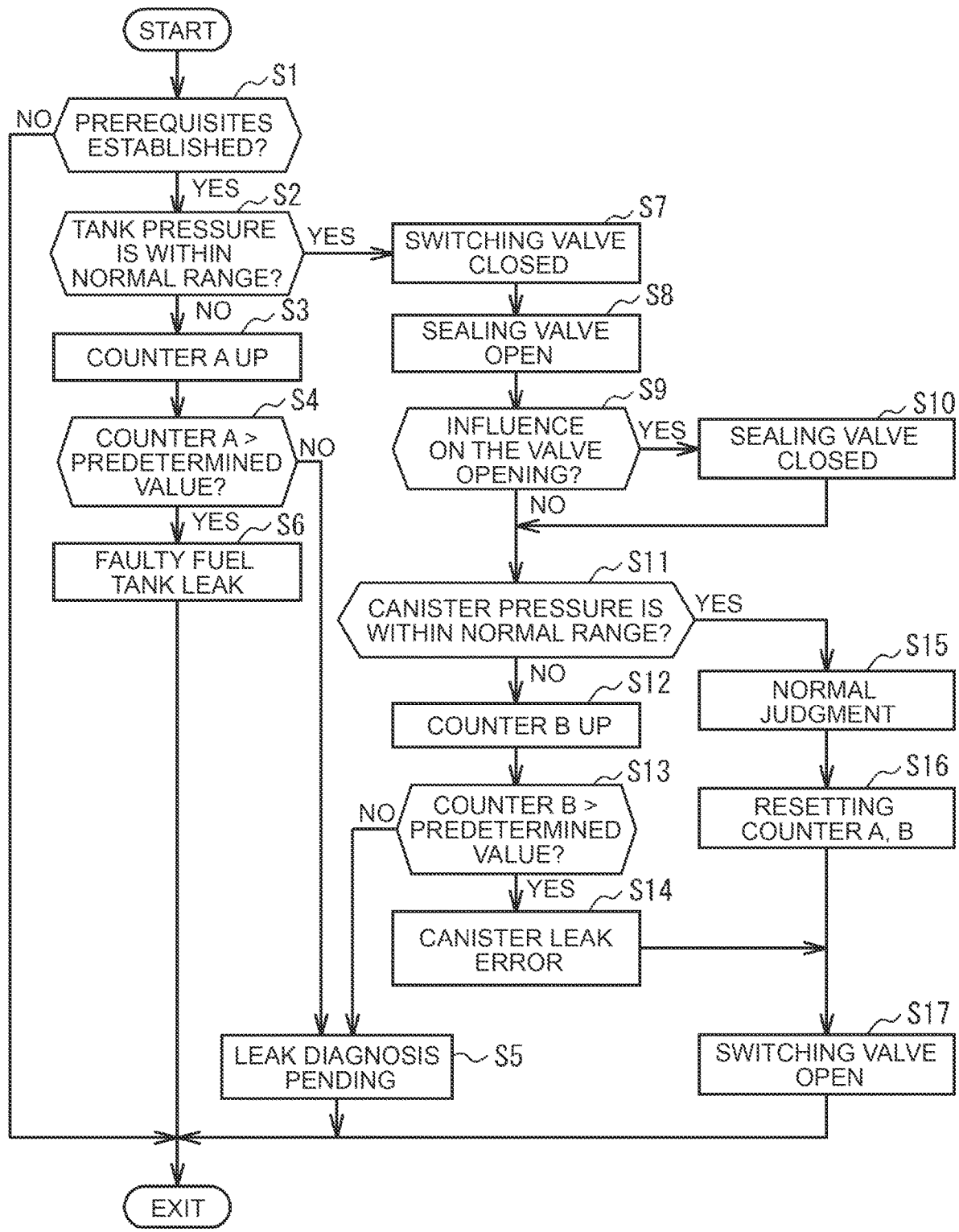
FIG. 3 is a flow chart exemplifying a leak diagnostic control executed by ECU.

FIG. 3 is a flow chart exemplifying a leak diagnostic control executed by ECU 60. This control is repeated continuously while the ignition is on. ECU 60 determines whether or not the precondition for the leak diagnosis is satisfied (S1). This precondition is a condition for determining that the generation of the fuel vapor in the fuel tank 30 is in a stable state. For example, the following conditions are satisfied.

The first condition is a period from the ignition switch-on to the opening of the purge valve 43 and immediately before the first purge to the intake passage 14 in the case of the ignition-on state after the internal combustion engine is stopped for a long time (a preset reference time or longer) by parking or the like. The second condition is a state in which several hours (for example, five hours) have elapsed after the ignition is turned off, and the cooling water temperature detected by the coolant temperature sensor is equal to or lower than a predetermined temperature (for example, 35° C.). Instead of the coolant temperature, the intake air temperature detected by the intake air temperature sensor may be used. The first condition or the second condition is set as a precondition. Note that a precondition may be a precondition in which the first condition and the second condition are used as a logical sum condition. If S1 is No, this control is terminated.

When S1 is Yes, the first leakage is diagnosed as follows. ECU 60 determines whether or not the tank internal pressure is within the normal range based on the detected value of the tank internal pressure sensor 50 (S2). The normal range is a range excluding a pressure range that can be regarded as an approximately atmospheric pressure in consideration of the tolerance of the tank internal pressure sensor 50. That is, in the case of a high pressure or a negative pressure excluding a range in which the tank internal pressure can be regarded as an approximately atmospheric pressure, it can be regarded that no leakage occurs in the fuel tank 30. This is because when a leak occurs in the fuel tank 30, the tank internal pressure becomes approximately atmospheric pressure.

If S2 is No, ECU 60 counts up counter-A (S3). Next, ECU 60 determines whether or not the counter-A is greater than a predetermined value (S4). If S4 is No, ECU 60 suspends leak diagnostics (S5). If S4 is Yes, ECU 60 determines that there is a leak error in the fuel-tank 30 (S6). As described above, the first leak diagnosis is performed. S4, S6 from S2 is an exemplary process executed by the first diagnosis unit.

If S2 is Yes, the in-tank pressure is considered to be within normal limits, and ECU 60 performs a second leak test as follows. ECU 60 closes the switching valve 46 (S7) and then opens the sealing valve 42 (S8). As a result, the tank internal pressure is transmitted to the inside of the canister 31, the portion between the canister 31 and the switching valve 46 of the outside air introduction passage 36, the valve body 461 of the switching valve 46, and the portion between the canister 31 and the purge valve 43 of the purge passage 33.

Next, ECU 60 determines whether the valve openability of the switching valve 46 is affected (S9). Specifically, ECU 60 determines that the valve openability of the switching valve 46 is affected when the canister internal pressure rises to a threshold value or more based on the detected value of the canister internal pressure sensor 51. The threshold is a pressure value that is higher than the standard atmospheric pressure and lower than the canister internal pressure that affects the valve openability of the switching valve 46. The canister internal pressure that affects the valve openability of the switching valve 46 is determined in advance based on experimental results and simulation results. S9 is an exemplary process executed by the determination unit.

If S9 is Yes, ECU 60 closes the sealing valve 42 (S10). As a result, the internal pressure of the canister can be prevented from becoming higher, and the valve openability of the switching valve 46 can be ensured.

When S9 is No or after S10 is executed, ECU 60 determines whether the canister internal pressure is within the normal range based on the detected value of the canister internal pressure sensor 51 (S11). If S11 is No, ECU 60 counts up counter B (S12). Next, ECU 60 determines whether or not the counter-B is greater than a predetermined value (S13). If S13 is No, ECU 60 suspends the leak diagnostic (S5). If S13 is Yes, ECU 60 determines that the canister 31 has a leak error (S14).

If S11 is Yes, ECU 60 determines that the fuel-tank 30 and the canister 31 are leaking normally (S15) and resets the counters A and B (S16). After S14 or S16 is performed, ECU 60 opens the switching valve 46 (S17). By opening the switching valve 46, the purge process can be performed by immediately opening the purge valve 43 when a purge request is made. S17 from S11 is an exemplary process executed by the second diagnosis unit.

As described above, the leakage diagnosis of the fuel tank 30 and the canister 31 can be performed while the valve openability of the switching valve 46 is ensured. Further, the purge process can be performed after the leak diagnosis.

When S9 is No, ECU 60 may determine whether the canister internal pressure is within the normal range based on the detected value of the tank internal pressure sensor 50. This is because, when S9 is No, the purge valve 43 and the switching valve 46 are closed and the sealing valve 42 is opened, so that the tank-internal pressure and the canister-internal pressure are the same.

Although the embodiments of the present disclosure have been described in detail above, the present disclosure is not limited to such specific embodiments, and various modifications and changes can be made within the scope of the gist of the present disclosure described in the claims.

What is claimed is:

1. A leak diagnosis device of a fuel vapor treatment apparatus, the leak diagnosis device comprising:
   a fuel tank configured to store fuel of an internal combustion engine;
   a canister configured to adsorb evaporated fuel generated in the fuel tank;
   a vapor passage communicating the fuel tank and the canister;
   a purge passage communicating an intake passage of the internal combustion engine and the canister;
   a sealing valve configured to open and close the vapor passage;
   a purge valve configured to open and close the purge passage;
   an outside air introduction passage configured to introduce outside air into the canister;
   an electronic switching valve configured to open and close the outside air introduction passage, the electronic switching valve comprising
   a valve body,
   a solenoid configured to apply thrust to the valve body, and
   a return spring, connected to the valve body and present inside the solenoid, the return spring being configured to apply an urging force in a direction opposite to the thrust of the solenoid to the valve body;
a first sensor configured to detect a tank internal pressure that is a pressure in the fuel tank;
a second sensor configured to detect a canister internal pressure that is a pressure in the canister;
a processor configured to
  perform a leak diagnosis of the fuel tank, the leak diagnosis of the fuel tank being perfom1ed based on the tank internal pressure in a state where the sealing valve is closed,
  determine whether valve openability of the switching valve is affected in a case where the sealing valve is opened, the purge valve and the switching valve are closed, and the tank internal pressure is within a normal range, and
  perform a leak diagnosis of the canister based on the tank internal pressure or the canister internal pressure in a case where determination of whether the valve openability of the switching valve is affected is a negative determination, and based on the canister internal pressure after closing the sealing valve in a case where determination of whether the valve openability of the switching valve is affected is an affirmative determination; and
an air filter connected to the electronic switching valve through the outside air introduction passage on a first side of the outside air introduction passage,
wherein the second sensor is inserted into a second side of the outside air introduction passage, the second sensor configured to detect pressure in the outside air introduction passage.

\* \* \* \* \*